April 24, 1951        J. M. NAUL        2,550,422
FLUID OPERATED CONTROL MECHANISM FOR ELECTRIC MOTORS
Filed July 14, 1949        3 Sheets-Sheet 1
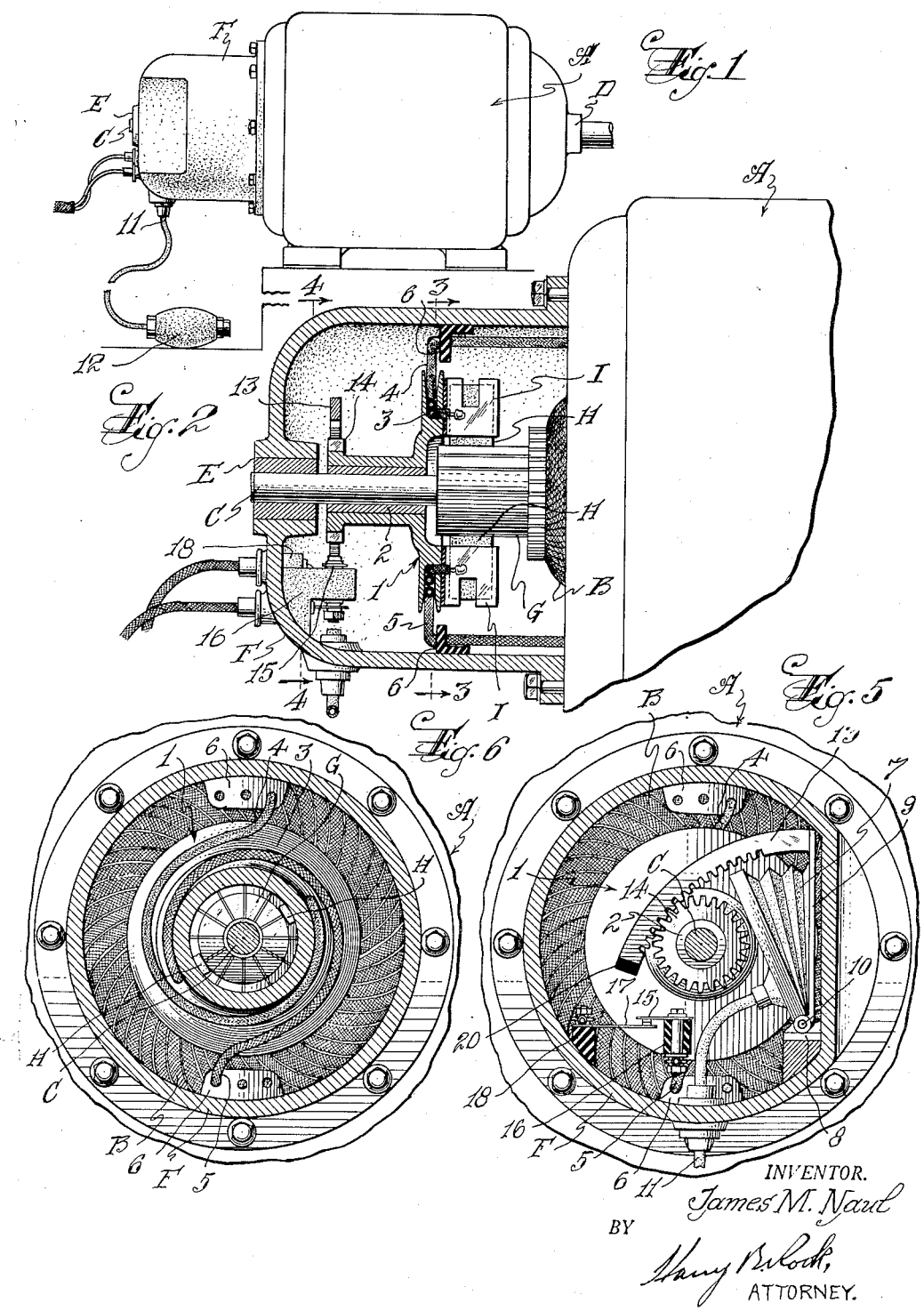
INVENTOR.
James M. Naul
BY
Harry B. Cook,
ATTORNEY.

INVENTOR.
James M. Naul
BY
Harry B. Cook,
ATTORNEY.

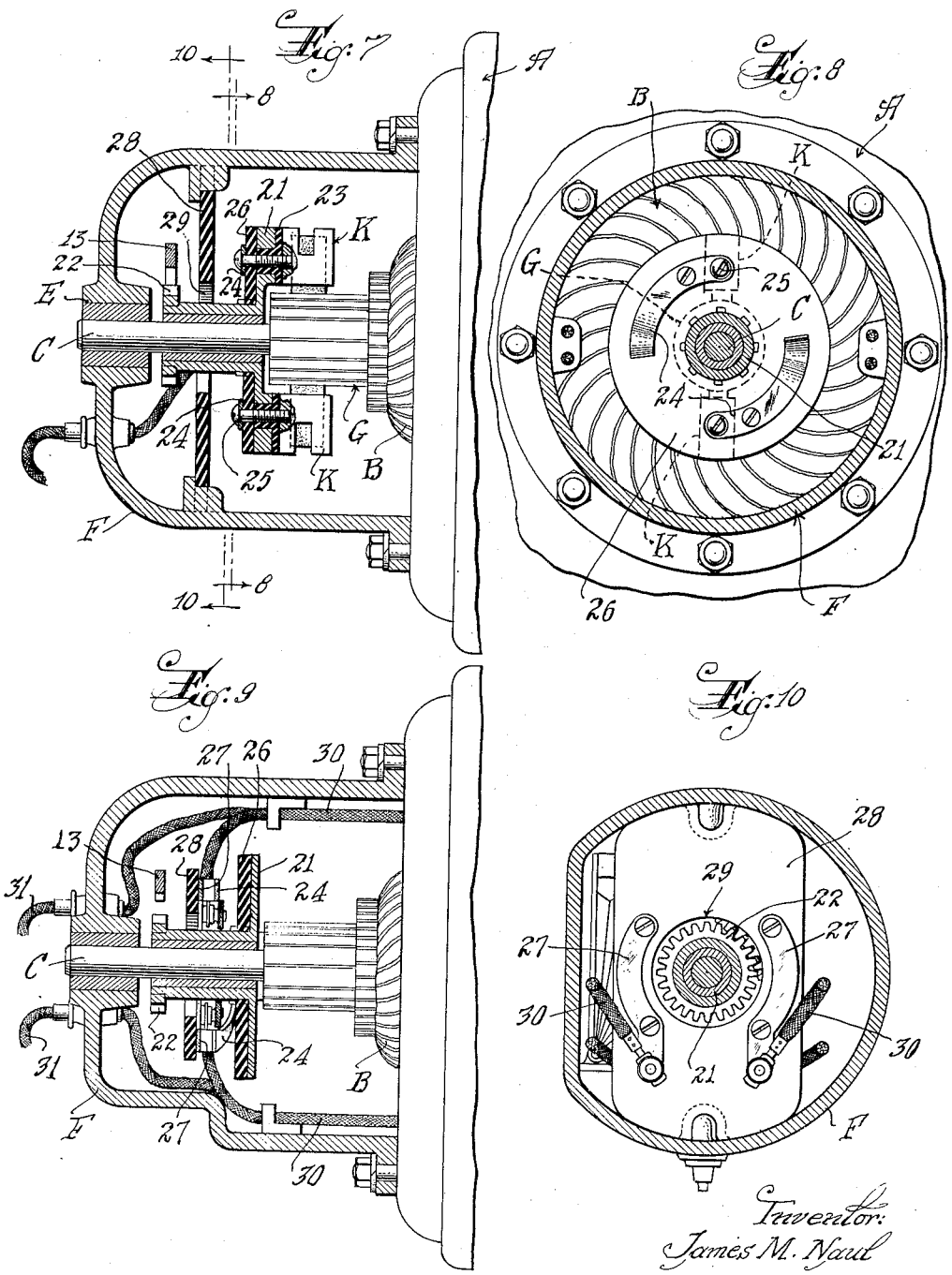

Patented Apr. 24, 1951

2,550,422

UNITED STATES PATENT OFFICE 2,550,422

FLUID OPERATED CONTROL MECHANISM FOR ELECTRIC MOTORS

James M. Naul, Plainfield, N. J.

Application July 14, 1949, Serial No. 104,610

8 Claims. (Cl. 318—335)

This invention relates to mechanism for controlling the speed of electric motors, particularly motors capable of operating with either alternating or direct current, such as are used, for example, for driving sewing machines, one object of the invention being to provide novel and improved motor speed control mechanism comprising, for example, shiftable brushes or a rheostat actuated by fluid pressure, whereby to ensure a gradual or smooth control of the speed of the motor.

Another object is to provide a speed control of this character which can be easily actuated with precision by the mere squeezing of a rubber bulb, or by simple actuation of some other fluid pressure producing mechanism, for example, by the hand or by the foot of the operator.

Other objects are to provide such speed control mechanism which shall be relatively simple and reliable in construction and operation; and to obtain other advantages and results that will be brought out by the following description in conjunction with the accompanying drawings in which:

Figure 1 is a schematic elevational view of an electric motor having a speed control mechanism embodying my invention applied thereto.

Figure 2 is an enlarged fragmentary central longitudinal vertical sectional view through the speed control mechanism, showing the parts in normal position while the motor is at rest.

Figure 5 is a view similar to Figure 4 showing the fluid operated actuating mechanism in one of the positions assumed during the operation of the motor.

Figure 6 is a view similar to Figure 3 showing the brushes and their wire connections in the positions corresponding to the position of the actuating mechanism in Figure 5.

Figure 7 is a view similar to Figure 1 showing another form of the invention.

Figure 8 is a transverse view approximately on the plane of the line 8—8 of Figure 7.

Figure 9 is a fragmentary central horizontal sectional view through the speed control mechanism showing the parts as illustrated in Figure 7, and Figure 10 is a transverse vertical sectional view approximately on the plane of the line 10—10 of Figure 7.

Figure 3:
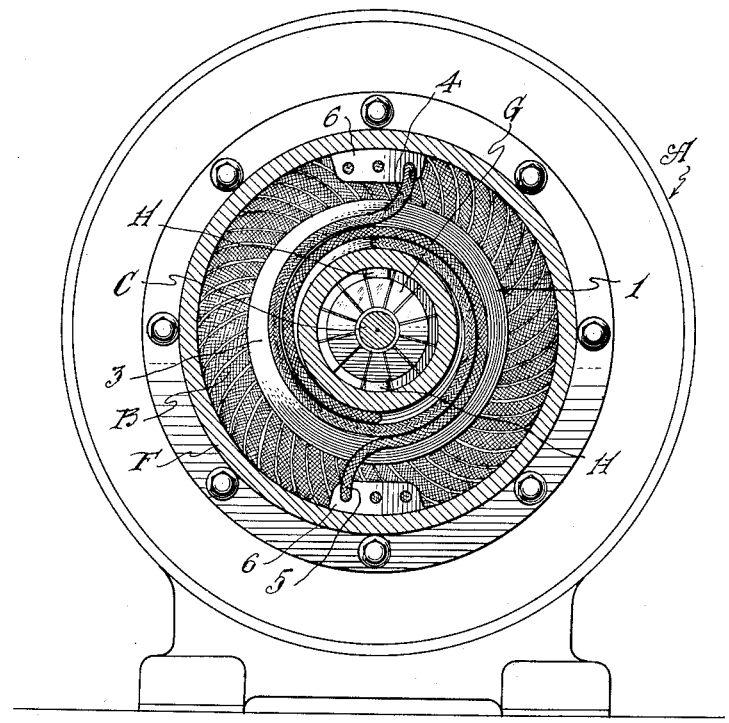
Figure 3 is a transverse vertical sectional view approximately on the plane of the line 3—3 of Figure 2.

Specifically describing the illustrated embodiment of the invention, I have shown it in conjunction with a known type of electric motor A, for example, a single phase series motor which will operate on either alternating or direct current and having an armature B mounted on a shaft C which is journaled in bearings D and E one of which, in the present instance the bearing E, is mounted in an auxiliary casing or cover F secured to one end of the main housing of the motor. The motor also includes the usual commutator G which is electrically connected to the armature in the known way; and cooperating with the commutator are brushes H which are mounted in suitable brush holders I so as to be normally influenced into electrical contact with the commutator.

In accordance with the invention these brush holders I are carried by a rocker ring 1 which has a sleeve-like hub journaled on a lubricated bearing 2 on the motor shaft C so as to rotate relatively to the shaft. The rocker ring has a deep peripheral groove 3 in which lie two flexible electrical conductors 4 and 5 one end portion of each of which is spirally coiled in said groove in reversed and overlapping relation to the corresponding portion of the other conductor and in the same plane therewith transverse of the axis of the ring as best shown in Figures 5 and 6.

The end of each conductor passes through an opening in the rocker ring and is electrically connected to one of the brush holders I. These conductors electrically connect the brushes in the motor circuit in known manner and the coiled end portions thereof are held in their proper plane by insulating brackets 6 that are secured to the interior of the auxiliary housing or cover F. The depth of the groove 3 is such that when the ring 6 is rotated to shift the brushes the required distance, for example, 120°, the spirally coiled end portions spread apart in the nature of a spring as shown by a comparison of Figures 3 and 6, so as to always remain in proper position and free from danger of entanglements with each other or other parts of the mechanism.

Figure 4:
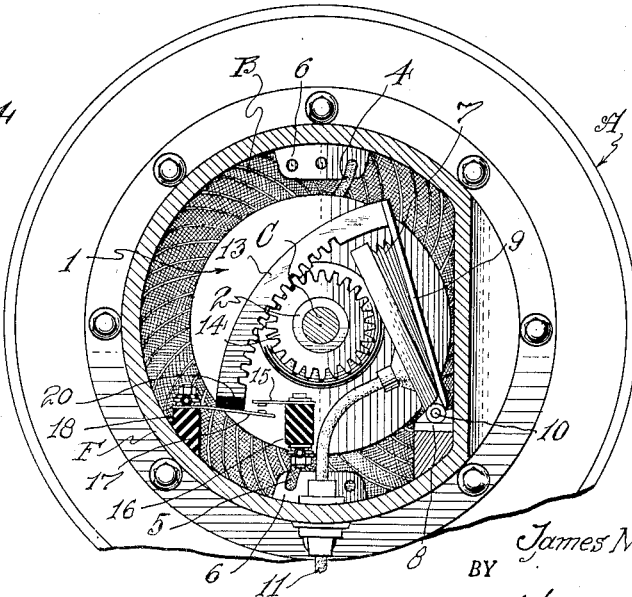
Figure 4 is a similar view approximately on the plane of the line 4—4 of Figure 2 showing the fluid operated actuating mechanism in normal or at-rest position.

In accordance with the invention, the rocker ring 1 is rotated to shift the brushes by mechanism operated by fluid pressure, either pneumatic or hydraulic. As shown, a bellows 7 is fixedly mounted on a bracket 8 on the cover F and has a metal cover 9 hinged at 10 so as to be normally actuated, for example, by gravity or by suitable spring means, to collapse the bellows as shown in Figure 4. The bellows is connected by a tube 11 to another suitable pressure generating device, such as a rubber bulb 12, which may be operated by either the hand or the foot of the operator. For example, the motor might conveniently be mounted on a table or bench and the bulb or pressure generating device 12 could be arranged on the floor beneath the bench.

A gear segment 13 is carried by the bellows plate 9 and meshes with a pinion 14 rigidly connected to the hub of the rocker ring 1 so that upon swinging of the plate 9 the gear segment 13 will be longitudinally moved to rotate the pinion 14 and rocker ring 1. The normal positions of the bellows, gear segment, rocker ring and brushes are shown in Figures 2, 3 and 4, these positions corresponding to the idle or at-rest conditions of the motor.

When the plate 9 and segment 13 are in their said normal positions, the gear segment 13 holds open a switch which is connected in circuit with the motor for controlling the supply of electricity to the motor. As shown, this switch includes a fixed contact element 15 mounted on an insulated bracket 16 on the cover F, and a spring contact 17 mounted on another insulated bracket 18 and normally held by its inherent resiliency in contact with the element 15 to close the circuit as shown in Figure 5. The spring element 17 is held out of contact with the element 15 by the end of the segment 13 when the latter is in its normal position as shown in Figure 4, said segment preferably having an insulating block 20 to engage the contact element 17.

In operation, when it is desired to start the motor, the pressure generating device 12 is actuated so as to inflate the bellows 7 and cause the plate 9 to swing to the right in Figure 4. The switch 15, 17 is thus permitted to close as shown in Figure 5 and the brushes are shifted to the desired position by proper control of the fluid pressure through the generating device 12. At the starting or low speed position, the armature field and main field of the motor coincide, thus producing maximum reactance of the motor. This causes a corresponding reduction in current and the torque is further reduced because of counter torque conditions set up within the armature. By increasing the fluid pressure, for example, by increasing the pressure on the control bulb 12, the brush rocker ring is turned more and more in the direction opposite the direction of rotation of the armature, thereby reducing the total reactance, increasing current and reducing the counter torque so as to cause an increase in the speed of rotation of the armature. Obviously the speed may be reduced by reducing the pressure on the rubber bulb 12. The mechanism embodying the invention thus ensures slow starting of the motor, smooth gradual acceleration thereof, and easy and precise control of the speed.

Another form of the invention is shown in Figures 7 to 10 inclusive where the brush holders K are carried by a rocker ring 21 in general similar to the rocker ring 1 and having a pinion 22 on its hub which may be rotated by the same mechanism hereinbefore described for operating the rocker ring 1. The brush holders K are insulated from the rocker ring by suitable insulating bushings 23 and are electrically connected to arcuate spring contact members 24 by any suitable means such as screws 25 which may also serve to mount said contact members on an insulating ring 26 carried by the rocker ring. The contact members 24 cooperate with fixed contact members 27 which are mounted on an insulating plate 28 which is secured in the auxiliary cover F of the motor and has an opening 29 through which extend the motor shaft C and the hub of the rocker ring 21. Each of the contact members 26 is connected by a cable 30 in circuit with the field coils of the motor to which current is supplied in known manner from line wires 31.

With this construction, it will be observed that when the rocker ring 21 is in one position, the free ends of the arcuate contact springs 24 will be disposed between and out of contact with the ends of the fixed contact members 27 so as to break the circuit through the motor and thereby cause the motor to remain at rest; while when the rocker ring is rotated, the contact springs 24 will be brought into contact with the respective fixed contact members 27 so as to close the circuit through the motor. The contact springs 24 and their fixed contact members 27 serve the same purpose as do the switches 15 and 17 hereinbefore described.

The operation of this form of the invention is otherwise the same as that shown in Figures 1 to 6 inclusive, the rocker ring normally being in the position to locate the contact springs 24 out of contact with the fixed contacts 27 with the motor in idle condition. To start the motor, the pressure generating device 12 is actuated so as to inflate the bellows 7 and cause rotation of the rocker ring 21, thereby causing the contact springs 24 to engage the contacts 27 and close the circuit through the motor. By increasing the fluid pressure generated by the device 12, the rocker ring 21 may be rotated further in the same direction so as to cause an increase in the speed of rotation of the armature B, while by decreasing the fluid pressure the rocker ring will be actuated in the other direction to reduce the speed of the armature.

While I have shown and described a preferred embodiment of the invention, it will be understood by those skilled in the art that a pneumatically or hydraulically controlled rheostat instead of shifting the brushes could be used to produce similar results, in which case the pinion 14 would be mounted on the operating shaft of the rheostat so that rotation of the pinion by the segment would rotate such shaft and move the contact arm of the rheostat. Moreover, other types of fluid pressure motors than the bellows may be utilized, and other fluid pressure generating devices than the rubber bulb can be employed.

In both the shiftable brush system and the rheostat system of speed control, it will be observed that the fluid pressure operated actuating means is connected to the operating element of the system, that is, the brush support or rocker ring and the shaft of the rheostat by which the contact arm is moved over the contact points of the resistance coils, respectively.

I claim:

1. The combination with an electric motor speed controlling system including an armature, a commutator and brushes shiftable relatively thereto, of a ring rotatable coaxially relatively to said commutator and on which said brushes are mounted, conductors each having one end connected to one brush for electrically connecting said brushes in the motor circuit, a fluid pressure operated motor, an operative connection between said motor and said ring for rotating said ring, and means controlling the application of fluid pressure to said motor.

2. The combination as defined in claim 1 wherein the portions of said conductors adjacent said ends thereof are reversely spirally coiled in overlapping relation in a common plane transverse of the axis of said ring.

3. The combination as defined in claim 1 wherein the portions of said conductors adjacent said ends thereof are reversely spirally coiled in overlapping relation in a common plane transverse of the axis of said ring and said ring has a deep peripheral groove in which said spirally coiled portions of said conductors are arranged.

4. The combination with an electric motor speed controlling system including an armature, a commutator and brushes shiftable relatively thereto, of a ring rotatable coaxially relatively to said commutator and on which said brushes are mounted, conductors each having one end connected to one brush for electrically connecting said brushes in the motor circuit, a fluid pressure operated motor, a pinion fixedly connected to said ring coaxially therewith, and a gear rack connected to and actuated by said motor and meshing with said pinion, and means controlling application of fluid pressure to said motor.

5. The combination with an electric motor speed controlling system having a movable operating element, of a fluid pressure motor, an operative connection between said motor and said operating element, and means for controlling the supply of fluid pressure to said fluid pressure motor, a switch for controlling supply of electricity to the electric motor, said operative connection between the fluid pressure motor and said operating element including a part to control said switch to permit supply of electricity upon movement of said operative connection to rotate said ring in the direction to increase the speed of the electric motor.

6. The combination with an electric motor speed controlling system having a rotatable operating element, a pinion fixed coaxially on said operating element, a fluid pressure motor, a gear rack connected to and actuated by said fluid pressure motor and meshing with said pinion for rotating said operating element, and means for controlling application of fluid pressure to said motor.

7. The combination with an electric motor speed controlling system having a rotatable operating element, a pinion fixed coaxially on said operating element, a fluid pressure motor, a gear rack connected to and actuated by said fluid pressure motor and meshing with said pinion for rotating said operating element, and a rubber bulb connected to said fluid pressure motor for generating and controlling application of fluid pressure to said fluid pressure motor.

8. The combination with an electric motor speed controlling system including an armature, a commutator and brushes shiftable relatively thereto, of a ring rotatable coaxially relatively to said commutator and on which said brushes are mounted, conductors each having one end connected to one brush for electrically connecting said brushes in the motor circuit, arcuate contact elements mounted on said ring concentrically therewith and spaced circumferentially thereon and each electrically connected to the other end of one of said conductors, similarly spaced arcuate contact members mounted on a fixed support to cooperate with said contact elements upon rotation of said rings for controlling supply of electricity to said motor, a fluid pressure operated motor, an operative connection between said motor and said ring for rotating said ring, and means controlling the application of fluid pressure to said motor.

JAMES M. NAUL.

REFERENCES CITED

The following references are of record in the file of this patent:

UNITED STATES PATENTS

| Number | Name | Date |
| --- | --- | --- |
| 765,030 | Moore | July 12, 1904 |
| 1,406,495 | Rumfelt | Feb. 14, 1922 |
| 1,818,803 | Hull | Aug. 11, 1932 |
| 2,105,926 | Mueller | Jan. 18, 1938 |

FOREIGN PATENTS

| Number | Country | Date |
| --- | --- | --- |
| 231,588 | Great Britain | Apr. 6, 1925 |